United States Patent
Broadley et al.

(10) Patent No.: US 11,885,442 B2
(45) Date of Patent: Jan. 30, 2024

(54) MECHANICAL JOINING OF NITINOL TUBES

(71) Applicant: VIANT AS&O HOLDINGS, LLC, Foxborough, MA (US)

(72) Inventors: Mark W. Broadley, Downingtown, PA (US); Michael D. Wood, Lansdale, PA (US); Jim D. Cooney, Gilbertsville, PA (US); Timothy Hoklas, Crystal Lake, IL (US)

(73) Assignee: VIANT AS&O HOLDINGS, LLC, Foxborough, MA (US)

( * ) Notice: Subject to any disclaimer, the term of this patent is extended or adjusted under 35 U.S.C. 154(b) by 0 days.

(21) Appl. No.: 16/222,312

(22) Filed: Dec. 17, 2018

(65) Prior Publication Data

US 2019/0186659 A1      Jun. 20, 2019

Related U.S. Application Data

(60) Provisional application No. 62/599,307, filed on Dec. 15, 2017.

(51) Int. Cl.
*F16L 13/14*        (2006.01)
*F16L 13/007*      (2006.01)
*F16G 11/00*        (2006.01)

(52) U.S. Cl.
CPC .............. *F16L 13/14* (2013.01); *F16G 11/00* (2013.01); *F16L 13/007* (2013.01)

(58) Field of Classification Search
CPC ..... F16L 13/14; F16L 13/007; F16L 25/0018; A61M 25/0021; A61M 39/10; A61M 25/0054
See application file for complete search history.

(56) References Cited

U.S. PATENT DOCUMENTS 4,297,779 A * 11/1981 Melton ................. F16B 1/0014
                                                          285/381.2
5,507,731 A      4/1996 Hernandez et al.
(Continued)

FOREIGN PATENT DOCUMENTS

EP       0115662       8/1984
EP       2392430      12/2011

OTHER PUBLICATIONS

"Interlocking Weld in Tube Clamp Connector Coupler for 1-5/8" Diameter 0.120 Wall Tubing" downloaded on Apr. 17, 2019 from 1. https://www.kartek.com/parts/interlocking-weld-in-tube-clamp-connector-coupler-for-1-58-diameter-0120-wall-tubing.html.

(Continued)

*Primary Examiner* — Michael W Hotchkiss
(74) *Attorney, Agent, or Firm* — Grossman, Tucker, Perreault & Pfleger, PLLC

(57) ABSTRACT

The present invention relates to mechanical joining of Nickel Titanium tubes, also known as Nitinol, to other tubular components. Such mechanical joining may be achieved by interpenetration of lobe features between the respective tubes by translating the tubes together on a longitudinal axis, a transverse axis, by a combination of translation and rotational motion or by a hinging motion. The Nitinol superelasticity is used to accommodate the lobe deformation required for assembly and to snap the lobe back into its original shape to complete the mechanical joint.

14 Claims, 6 Drawing Sheets

(56) References Cited

U.S. PATENT DOCUMENTS

| | | | | |
|---|---|---|---|---|
| 5,728,978 | A * | 3/1998 | Roberts | G10K 11/16 181/102 |
| 5,772,668 | A | 6/1998 | Summers et al. | |
| 5,807,241 | A * | 9/1998 | Heimberger | A61B 1/0055 600/139 |
| 6,053,922 | A * | 4/2000 | Krause | A61B 17/164 464/78 |
| 6,129,762 | A * | 10/2000 | Li | A61B 17/0401 411/55 |
| 6,193,706 | B1 * | 2/2001 | Thorud | A61M 25/0905 604/103.04 |
| 6,352,385 | B1 * | 3/2002 | Wojciechowski | F16D 1/033 403/364 |
| 6,391,414 | B1 * | 5/2002 | Hjertman | F16L 25/0018 138/155 |
| 6,447,518 | B1 * | 9/2002 | Krause | A61B 17/164 606/80 |
| 6,635,047 | B2 | 10/2003 | Forsberg | |
| 6,682,493 | B2 * | 1/2004 | Mirigian | A61M 25/09 600/585 |
| 6,875,949 | B2 | 4/2005 | Hall | |
| 6,915,169 | B2 | 7/2005 | Flynn et al. | |
| 6,921,397 | B2 * | 7/2005 | Corcoran | A61M 25/0043 464/149 |
| 7,758,520 | B2 | 7/2010 | Griffin et al. | |
| 7,766,821 | B2 * | 8/2010 | Brunnen | A61B 1/0055 600/142 |
| 7,867,219 | B2 | 1/2011 | Chambers | |
| 8,382,742 | B2 * | 2/2013 | Hermann | A61B 17/1631 606/1 |
| 8,419,658 | B2 | 4/2013 | Eskuri | |
| 8,500,785 | B2 | 8/2013 | Gunderson | |
| 8,827,910 | B2 * | 9/2014 | de la Rama | A61B 18/1492 600/466 |
| 8,974,454 | B2 * | 3/2015 | de la Rama | B23K 26/38 606/41 |
| 8,986,317 | B2 * | 3/2015 | Verbeek | A61B 17/00234 219/121.72 |
| 9,399,262 | B2 | 7/2016 | Hausladen et al. | |
| 9,539,670 | B2 * | 1/2017 | McDermott | B23K 33/006 |
| 10,434,288 | B2 * | 10/2019 | Hansen | A61M 25/09 |
| 10,525,231 | B2 * | 1/2020 | Moquin | A61M 25/0045 |
| 2002/0025396 | A1 * | 2/2002 | Hjertman | F16L 25/009 428/36.9 |
| 2003/0028127 | A1 * | 2/2003 | Balzum | A61M 25/0905 600/585 |
| 2005/0043711 | A1 * | 2/2005 | Corcoran | A61M 25/0054 604/523 |
| 2006/0006649 | A1 | 1/2006 | Galdonik et al. | |
| 2006/0074403 | A1 * | 4/2006 | Rafiee | A61M 25/0041 604/530 |
| 2006/0281566 | A1 * | 12/2006 | Lee | F16D 3/52 464/149 |
| 2008/0097398 | A1 | 4/2008 | Mitelberg et al. | |
| 2008/0215008 | A1 | 9/2008 | Nance et al. | |
| 2009/0157162 | A1 | 6/2009 | Chow et al. | |
| 2010/0023010 | A1 | 1/2010 | Nelson et al. | |
| 2011/0015675 | A1 * | 1/2011 | Howard | A61B 17/0469 606/232 |
| 2012/0143175 | A1 * | 6/2012 | Hermann | A61B 17/3207 606/1 |
| 2014/0025045 | A1 | 1/2014 | Abt et al. | |
| 2014/0235361 | A1 * | 8/2014 | Forster | F16C 1/04 464/149 |
| 2018/0093070 | A1 * | 4/2018 | Cottone | A61M 25/0108 |
| 2018/0322617 | A1 | 11/2018 | Moquin et al. | |
| 2019/0160259 | A1 * | 5/2019 | Cottone | A61M 25/0113 |

OTHER PUBLICATIONS

International Search Report and Written Opinion from related PCT/US18/67448 dated Apr. 8, 2019.
Extended European Search Report from related application 19815026.0, dated Feb. 2, 2022, 8 pages.

* cited by examiner

MECHANICAL JOINING OF NITINOL TUBES

CROSS-REFERENCE TO RELATED APPLICATIONS

This application claims the benefit of U.S. Provisional Application 62/599,307 filed Dec. 15, 2017 which is fully incorporated herein by reference.

FIELD

The present invention relates to mechanical joining of Nickel Titanium tubes, also known as Nitinol, to other tubular components. Such mechanical joining may be achieved by interpenetration of lobe features between the respective tubes which may be achieved by translating the tubes together on a longitudinal axis, a transverse axis, by a combination of translation and rotational motion or by a hinging motion.

BACKGROUND

Nitinol is an alloy of approximately 50% Nickel and 50% Titanium. The difference of electronegativity between the two elements (Ni=1.9 and Ti=1.54 Pauling electronegativity) is large enough that they violate the Hume Rothery solubility criteria and combine when melted and cooled to room temperature as a NiTi body centered cubic intermetallic compound in which every nickel atom is surrounded by a titanium atom and visa versa. This gives the material unusual mechanical behaviors, including what is referred to as superelasticity. Such superelasticity is a pseudoelastic response to an applied stress caused by a phase transformation between the austenitic and martensitic phases of a crystal. The material composition makes welding of nitinol to other engineering materials problematic, since either the Nickel or the Titanium will form brittle intermetallic compounds with many other metals and their alloys, including stainless steels.

On some device designs, nitinol tubing is required to provide flexibility at a specific location along a long drive tube. Since nitinol is relatively expensive, it is logical to use the nitinol only where it is needed for flexibility and join it to a relatively lower cost tube, like stainless steel, that would provide most of the remaining length of the drive tube. Historically this has been accomplished by welding the tube ends together.

One successful welding method for joining Nitinol to stainless steel involves welding the Nitinol component to an intermediate component made of Nickel, Cobalt or Tantalum and their alloys which are compatible with both metals. This approach involves the additional cost of the intermediate metal component as well as the cost of welding. For relatively simple product forms like wire, this may be a cost effective approach. For more complex product forms like tubing, the cost and lead time for the intermediate metal component, as well as the more complex tube welding methods, make this approach less attractive.

Accordingly, a need remains for a method of joining Nitinol tubing to other tubular structures, made of materials other than Nitinol, that would avoid welding procedures and the need for an intermediate metal component, and other associated problems.

SUMMARY

A method of forming a mechanical joint between a Nitinol tube and a corresponding metallic tubular component comprising: providing a first Nitinol tube wherein said tube includes an end portion and a plurality of first protruding lobes extending from said end portion; providing a second metallic tubular component having an end portion and a plurality of second protruding lobes extending from said second tube end portion, wherein said second protruding lobes are complimentary in size and geometry with the first protruding lobes. This may then be followed by mechanical engaging said first Nitinol tube end portion having said first plurality of lobes with said second tubular component having said second plurality of lobes wherein said lobes engage and form a mechanical joint.

In one product form, the present invention relates to a Nitinol tube comprising an end portion have a plurality of lobes extending from said end portion, wherein said plurality of lobes have an initial tapered width $W_1$ and a length L, wherein the length to width aspect ratio is 0.33:1 to 10:1.

In another product form, the present invention relates to a Nitinol tube comprising an end portion having a plurality of lobes extending from said end portion, wherein said plurality of lobes at the end of the tube have a width $W_3$ and a length L from the end of the tube, where the length to width ratio is in the range of 0.33:1 to 2:1.

BRIEF DESCRIPTION OF THE DRAWINGS

The objects, features and advantages of the present invention will be apparent from the following detailed descriptions of the preferred aspects of the invention in conjunction with reference to the following drawings, where.

DETAILED DESCRIPTION

The present invention provides a structure and associated method for the mechanical joining of Nitinol tubing to other metallic tubular components. Reference to Nitinol herein should be understood as a metal alloy containing Nickel and Titanium in approximately equal amounts. The other tubular components that may be utilized herein include, but are not limited to any metallic based tubing, and in particular metal tubing that does not utilize Nitinol. Accordingly, such metallic based tubing may include stainless steel, such as 304 and 316 stainless steel, precipitation hardenable (PH) stainless steel such as 17-7 PH™, cobalt alloys such as MP35N, and nickel alloys such as Inconel™ 600, 625 and 718.

Figure 1:
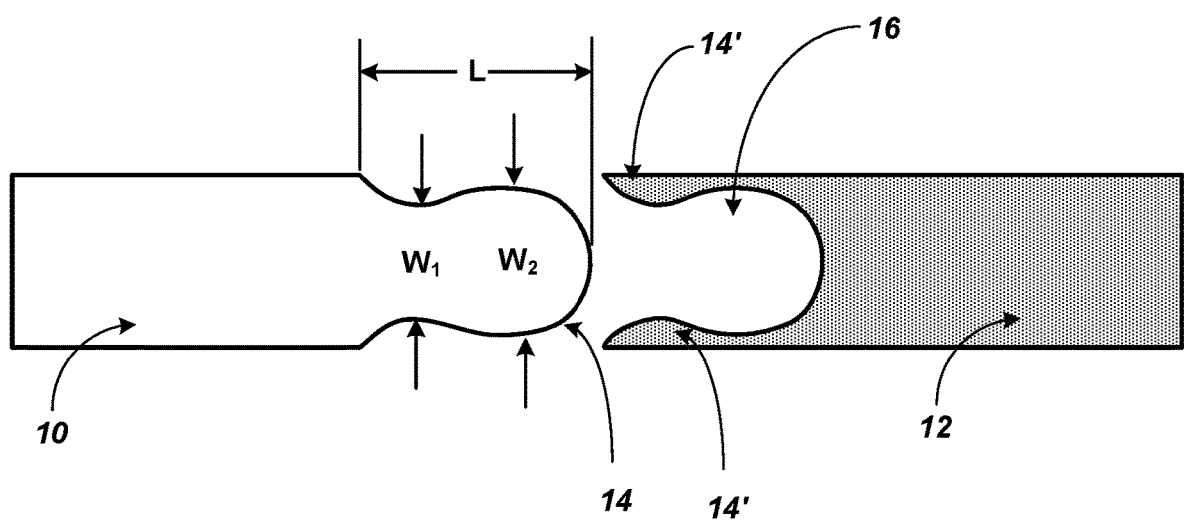
FIG. 1 illustrates an exemplary lobe structure in accordance with the present invention.

The tubular components herein are provided with a plurality of lobe features extending from the end of the tubes. With reference to FIG. 1, a side view of a Nitinol tube 10 and a corresponding metallic tubular component 12 is identified. As can be seen, at one end of Nitinol tube 10 is a protruding lobe feature 14 and on the metallic tubular component 12 there are corresponding lobe features 14' defining a recess or opening 16. While one lobe feature is illustrated in FIG. 1, it should be appreciated herein that there are a plurality of such lobe features the end of the tubes 10 and 12, which are complimentary to one another, and the single lobe feature is illustrated to facilitate description of the invention. Reference to the feature that the lobe 14 on tube 10 are complimentary to lobe 14' on tube 12 is reference to the feature that such lobes have a size and geometry that allows for the lobes to join together and provide mechanical engagement with the formation of a mechanical joint, as described further herein.

A lobe herein may therefore be understood as a protruding feature of varying geometry that extends from one end of the tube Accordingly, as seen in FIG. 1, the lobe 14 extends from the tube 10 and may taper to an initial minimum width $W_1$ and a length L. The minimum width $W_1$ then expands to a second and greater width $W_2$. Again, it should be understood that there are a plurality of such lobes present, and complimentary lobes of similar geometry and size on tube 12.

The tubing herein with the now identified lobe features is tubing that may be preferably utilized in a variety of medical device applications. Accordingly, the outer diameters (OD) of the tubing that may be joined herein preferably ranges from 0.010 inch OD to 0.625 inch OD. Wall thickness preferably ranges from 0.002 inch to 0.065 inch. In addition, the OD to wall thickness ratio preferably falls in the range of 5:1 to 30:1.

While FIG. 1 therefore illustrates one exemplary lobe, it should now be appreciated that the Nitinol tube 10 and corresponding metallic tubular component 12 will have a plurality of lobe features, which preferably provides 2, 3, 4, 5, or 6 lobes. Each lobe will preferably have a lobe length (L) to width ($W_1$) aspect ratio from 0.33:1 to 10:1. See again, FIG. 1 for the location of length (L) and width ($W_1$). More preferably, the number of lobes is 2-3 and the lobe length to width aspect ratio is 2:1 to 5:1. In addition, one may preferably utilize lobes that have a length to width aspect ratio from 0.33:1 to 2:1. The lobes in the Nitinol tubing are preferably laser cut to such preferred dimensions and any dross formation is removed from the cut tube. However, in the broad context of the present disclosure, the lobes herein may be formed utilizing electrical discharge maching (EDM), computer numerical controlled (CNC) milling, abrasive water jet cutting or abrasive wire cutting.

Figure 2:
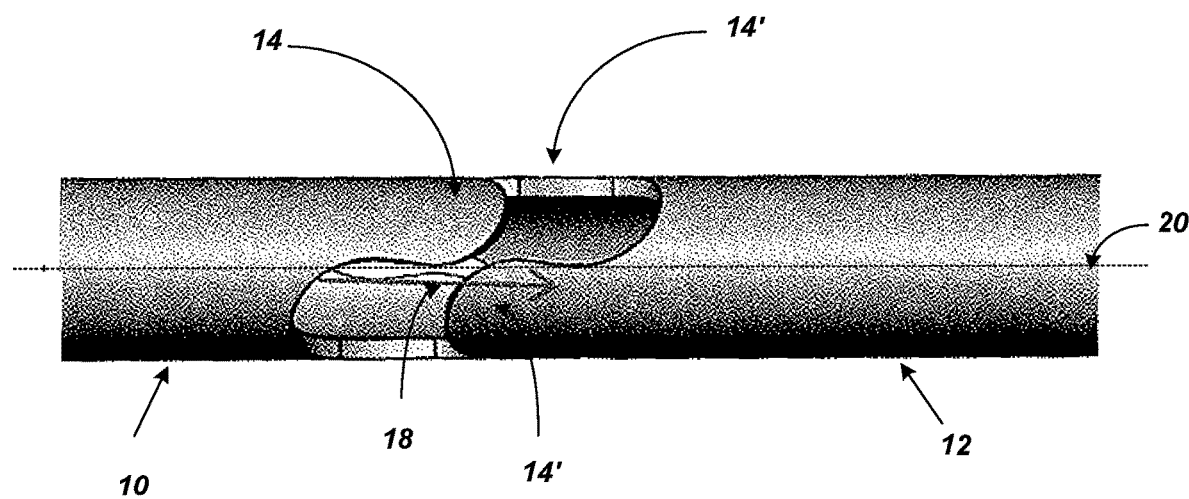
FIG. 2 illustrates a Nitinol tube and corresponding metal tube as they are configured for mechanical engagement.

Attention is next directed to FIG. 2 which illustrates Nitinol tube 10 and corresponding metal tube 12 translating toward one another via arrow 18 in an axial direction along a common longitudinal axis (see dotted line 20). The two lobes 14 on the Nitinol tube 10 are held opened so that the tube ID at the lobe apex is larger than the OD of the original tube. The right tube 12 is then moved toward the left Nitinol tube 10 along the common axis 20 until the two right tube lobe apexes align with the two corresponding left piece lobes 14. The tubes 10 and 12 are then moved together until the complimentary lobes 14 and 14' are aligned. At this point the lobes 14 are released from their open position allowing them to move inwardly to their original position. This results in what may described as a snap fit which then serves to lock the lobes 14 and 14' together. See FIG. 3. As Nitinol can provide up to 8.0% strain, it is contemplated that the amount of strain on the Nitinol lobes 14 that occurs when held open is greater than 1.0% up to 8.0%, and more preferably may fall in the range of greater than 1.0% to 6.0%. The strain herein is reference to the increase in length of the lobe inner stretched surface or the reduction in length of the outer compressed surface when the lobe is held open, as noted above.

Figure 3:
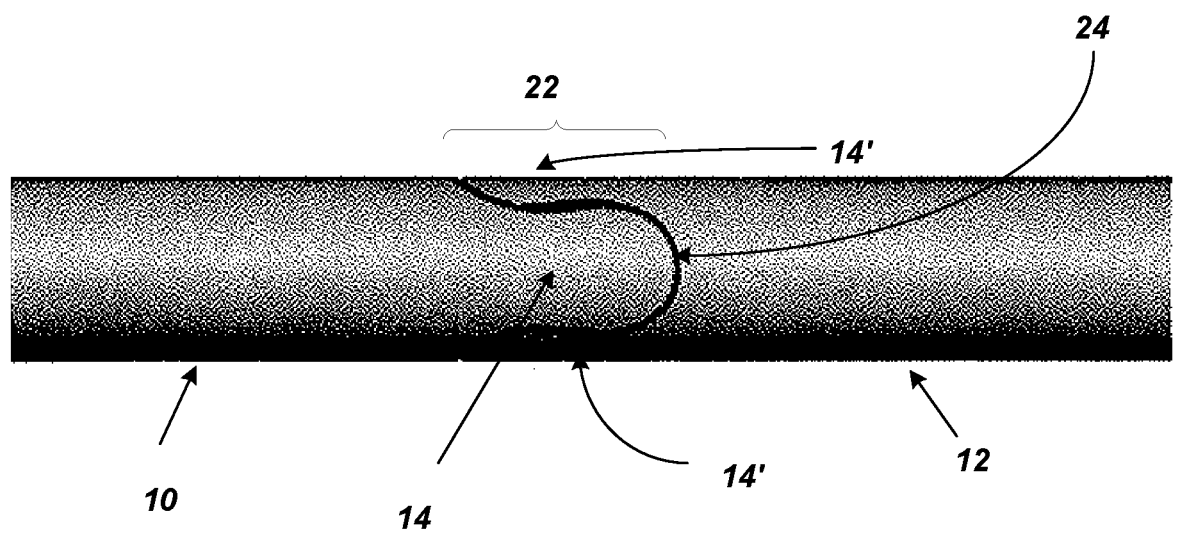
FIG. 3 illustrates a Nitinol tube engage with a corresponding metal tube and the formation of a mechanical joint between such tubing.

With reference to FIG. 3, it should be appreciated the mechanical engagement that is achieved herein by the interlocking lobes 14 and 14' is such that one may provide a mechanical joint 22 with different and targeted mechanical engagement characteristics. As illustrated, the mechanical joint is one that has a joint length that corresponds to the length L of the identified lobe. More specifically, as illustrated in FIG. 3, one may provide for a relatively small gap 24 to occur as between lobe 14 and tube 12, when in the mechanically engaged position. Such gap therefore will provide for some limited amount of motion as between the Nitinol tube 10 and the corresponding tubular component 12. It is contemplated that such a gap can provide for a mechanical joint with torsional flexibility (rotational freedom) of 1.0 degree to 3.0 degrees. However, it can be appreciated that when there is a flush and contacting fit between lobes 14 and 14', there would be less than 1.0 degree of rotational freedom, or more preferably in the range of 0.1 degree up to less than 1.0 degree of such freedom.

Furthermore, with respect to what may be understood as the pull apart strength of the joints made herein with the plurality of lobe configurations, such as joint 22 in FIG. 3, it is contemplated that such pull apart strength will be up to one-half of the yield strength (YS) of the tube made of the relatively weaker material. It should be noted that the tube with the weakest cross-sectional strength will ultimately limit the maximum tensile load that the joint can sustain. The pull apart strength would be measured by applying a load along the tube longitudinal axis (see, e.g., 20 in FIG. 2) until the joint is deformed and separates or the tube material at the joint breaks.

Figure 4:
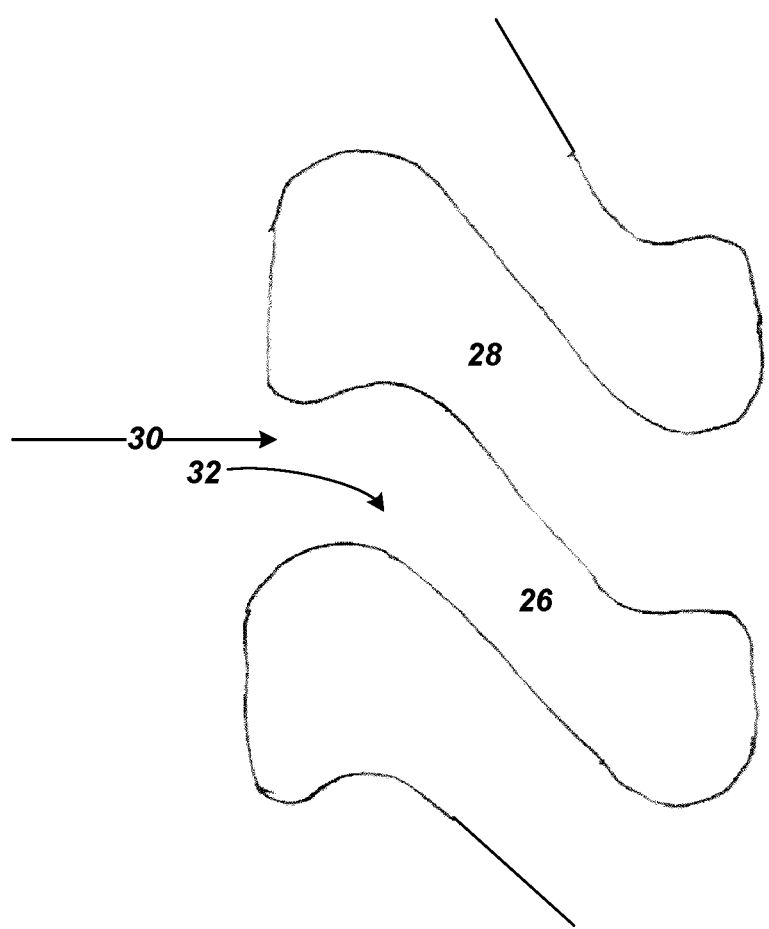
FIG. 4 illustrates a lobe geometry that is engaged by an initial axial movement followed by a rotational or twist motion.

While the above describes the use of translating axial joining of Nitinol tube 10 and corresponding tube 12, i.e. with reference again to FIG. 2, movement of the tube 10 and 12 along common longitudinal axis 20, the present invention also contemplates the use of a lobe geometry that would utilize such axial movement along with a rotational or twist motion. More specifically, with reference to FIG. 4, lobes 26 and 28, which may be understood as extending from the end of two tube sections, one being Nitinol, are shown in their engaged and interlocked position. It may therefore be appreciated that such lobe geometry 26 is preferably engaged via an initial axial movement (see arrow 30) followed by a rotational or twist motion (see arrow 32) of the respective tube portions that are to be mechanically joined together. This design allows the use of higher aspect ratio lobes without increasing the overall joint length. This in turn reduces the strain required of the Nitinol lobe during snap assembly.

It should therefore now be appreciated that the mechanical joining herein can be achieved by a variety of assembly techniques. As noted, mechanical engagement or formation of the mechanical joint can be achieved by translating the tubes together on a longitudinal axis. In addition, it should be appreciated that the tubes may be joined together by movement on an axis that is transverse to the longitudinal axis. In addition, the tubes may also be joined together by a hinging type motion (i.e. the tubes are initially connected and then moved towards one another about a rotational axis). With respect to the use of a hinging motion, such would apply where there is an odd number of lobes on each tube and wherein, e.g., one lobe on the Nitinol tube is inserted at an angle into a corresponding recess on the metallic tube. Once inserted, the remaining lobes are then moved together by a hinging motion until all of the lobes have engaged into their corresponding recess locations.

Figure 5:
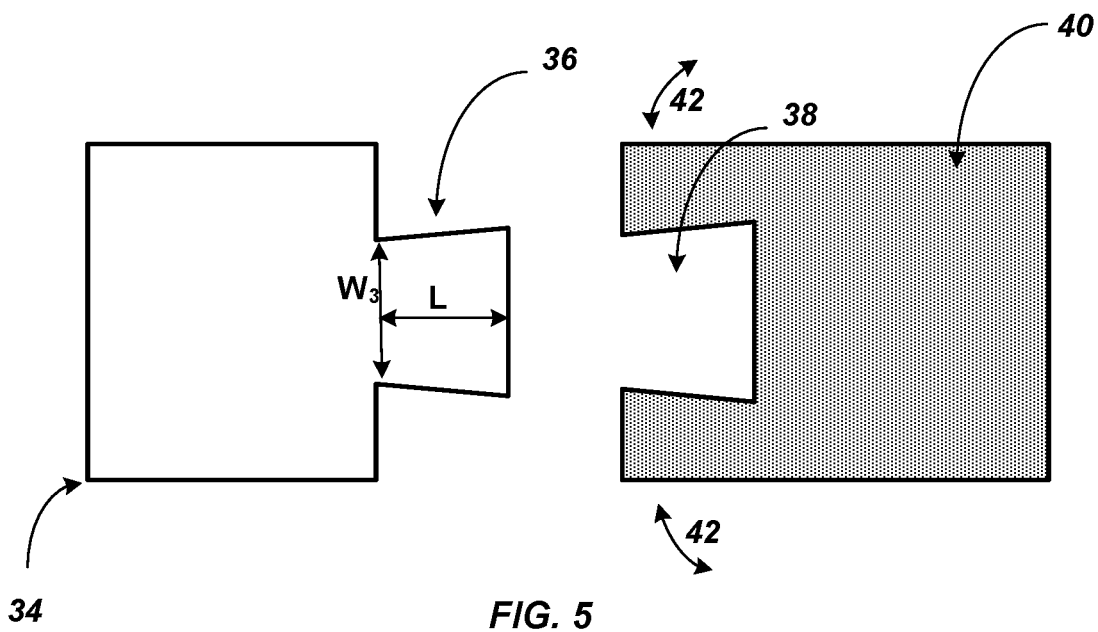
FIG. 5 illustrates a further preferred geometry for the lobes disclosed herein for placement on Nitinol tubing.
Figure 6:
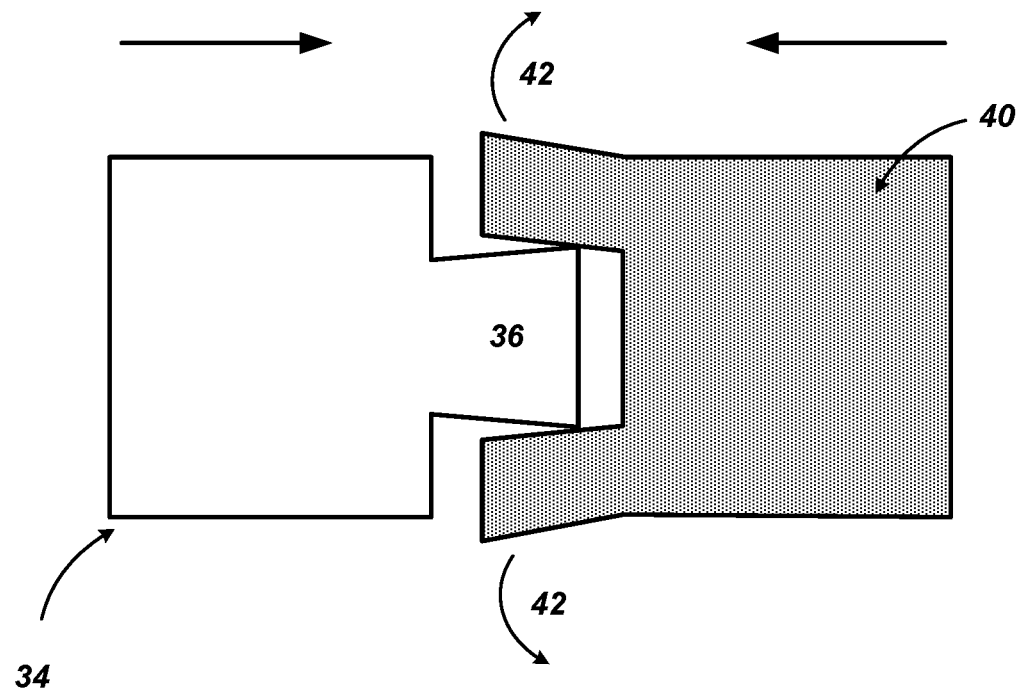
FIG. 6 illustrates engagement of the lobes illustrated in FIG. 5.
Figure 7:
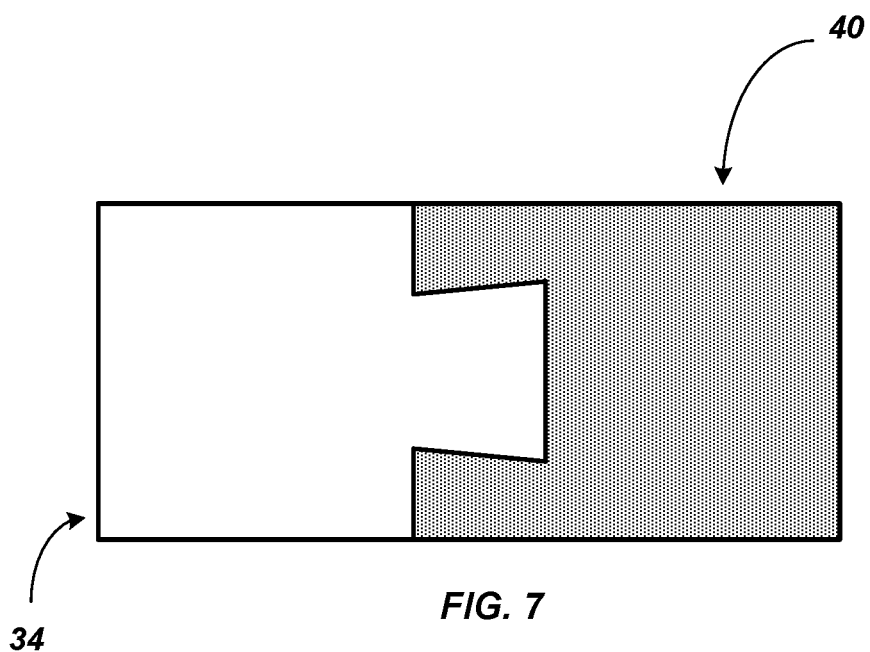
FIG. 7 illustrates the formation of a mechanical joint between the lobes illustrated in FIG. 5.

Reference is next directed to FIG. 5, which illustrates a further preferred geometry and size for the lobes herein. As illustrated, the end portion of tube 34 contains a plurality of lobes 36 which have a width $W_3$ at the end of the tube and a length L from the end of the tube, such that they define a relatively low length to width ratio. The end portion of tube 40 contains a corresponding plurality of lobes with the same lobe geometry and accordingly, a mating recess portion 38 for lobe 36. Preferably, such relatively low length (L) to width ($W_3$) aspect ratio is in the range of 0.33:1 to 2:1. As can also be seen, such lobes may have a geometry that may be described as an isosceles trapezoidal configuration, where the sides forming the protruding lobes are equal in length. In this particular embodiment, it can again be appreciated that tube 40, made of Nitinol, with its corresponding lobe geometry, is such that the lobes defining recess 38 may be again be held open (see arrows 42) so that the lobe 36 may be inserted into recess 38 while tubes 34 and 40 move towards one another until the lobes on tube 40 are released and snap inward to their original position. See FIGS. 6 and 7.

It should be noted that the holding open of the Nitinol lobes described in the various assembly procedures may be performed as a separate step prior to the assembly of the two tubes, or may be performed as a part of the assembly through the use of guiding assembly fixtures or by creating guiding features on the corresponding lobe geometries.

It can now be appreciated that there are a number of benefits and advantages to the present invention. Among other things, the formation and use of the aforementioned lobes and the formation of the mechanical joint as between Nitinol and another tubular component is such that welding is avoided. In addition, the use of an intermediate tubular component made of compatible alloys is also not required. Furthermore, the joint formed here is such that it can be understood as a joint that is self-aligning upon assembly. No sheath or internal alignment wire is required for assembly or in service.

Furthermore, the mechanical joining herein makes effective use of the superelasticity of Nitinol and forms a joint with the same OD and ID size as the Nitinol tube. As noted above, the mechanical joining may rely upon axial engagement, movement on an axis that is transverse to the longitudinal axis, by axial engagement with rotation or twisting of the tubular components or by a hinging motion. The superelastic recovery of the Nitinol provides formation of the identified joint where the Nitinol is initially deformed and then permitted to recover to its original shape. As Nitinol tubing is used in a variety of medical devices (e.g. flexible drives, catheters, stent delivery systems and elastic needles), the present invention provides a more practical approach to join Nitinol tubing to other metallic tubing.

What is claimed is:

1. A method of forming a mechanical joint, comprising providing a first tube formed of nitinol wherein the first tube includes an end portion having a plurality of protruding first tube lobes and a plurality of first tube lobe recesses; providing a metallic second tubular component including an end portion having a plurality of protruding second tubular component lobes and a plurality of second tubular component lobe recesses; wherein each lobe of the second tubular component lobes has a same size and geometry with each lobe of the first tube lobes such that the mechanical joint is formable with more than one arrangement of the first tube and the second tubular component relative to one another; disposing one lobe of the plurality of first tube lobes in one lobe recess of the plurality of second tubular component lobe recesses, respectively; disposing one lobe of the plurality of second tubular component lobes in one lobe recess of the plurality of first tube recesses, respectively; mechanically engaging the first tube end portion having the plurality of first tube lobes with the second tubular component end portion having the plurality of second tubular component lobes by translating toward one another in an axial direction on a common longitudinal axis, wherein each lobe of the plurality of first tube lobes mechanically engages with two adjacent lobes of the plurality of second tubular component lobes and each lobe of the plurality of second tubular component lobes mechanically engages with two adjacent lobes of the plurality of first tube lobes, such that a mechanical joint is formed which interlocks the first tube and the second tubular component against axial separation on the longitudinal axis; wherein, during mechanically engaging the first tube end portion with the second tubular component end portion the nitinol of the first tube deforms, and elastically recovers when the mechanical joint is formed; wherein the first tube deformation includes moving the plurality of first tube lobes from an original position to an open position and holding the plurality of first tube lobes at the open position;

wherein the first tube elastic recovery includes releasing the plurality of first tube lobes from the open position such that they return to the original position;

wherein superelasticity of the nitinol accommodates deformation and elastic recovery of the first tube when the mechanical joint is formed, whereby the nitinol undergoes a phas e transformation between austenitic and martensitic phases; and wherein the metallic second tubular component is formed of stainless steel, cobalt alloy or nickel alloy.

2. The method of claim 1 wherein the plurality of first tube lobes of the first tube comprise an initial minimum width (W1) and a length (L), wherein the length (L) to width (W1) aspect ratio of 0.33:1 to 10:1.

3. The method of claim 1 wherein the plurality of first tube lobes of the first tube comprises 2, 3, 4, 5 or 6 lobes.

4. The method of claim 1 wherein the first tube has an outer diameter (OD) of 0.010 inch to 0.625 inch.

5. The method of claim 1 wherein the first tube has a wall thickness of 0.002 inch to 0.065 inch.

6. The method of claim 1 wherein the outer diameter (OD) to wall thickness ratio is 5:1 to 30:1.

7. The method of claim 1 wherein each lobe of the plurality of first tube lobes and each lobe of the plurality of second tubular component lobes has a length (L) and a width at the end of the tube (W3) such that the length (L) to width (W3) ratio is in the range of 0.33:1 to 2:1.

8. The method of claim 1 wherein the mechanical engaging of the first tube end portion with the second tubular component end portion includes a strain on the plurality of first lobes of greater than 1.0% up to 8.0%.

9. The method of claim 1 wherein the mechanical joint has a torsional flexibility of 0.1 degree up to less than 1.0 degree.

10. The method of claim 1 wherein the mechanical joint has a torsional flexibility of 1.0 degree to 3.0 degrees.

11. The method of claim 1 wherein each lobe of the plurality of first tube lobes is disposable in any one lobe recess of all of the plurality of second tubular component lobe recesses, and each lobe of the plurality of second tubular component lobes is disposable in any one lobe recess of all of the plurality of first tube recesses.

12. The method of claim 1 wherein mechanical engaging the first tube end portion having the plurality of first tube lobes with the second tubular component end portion having the plurality of second tubular component lobes is performed by moving the first tube and/or the second tubular component towards one another along a common longitudinal axis of the first tube and the second tubular component.

13. The method of claim 1 wherein the mechanical joint interlocks the first tube and the second tubular component against separating along a common longitudinal axis of the first tube and the second tubular component via interference of the plurality of first tube lobes with the plurality of second tubular component.

14. A method of forming a mechanical joint, comprising: providing a first tube formed of nitinol wherein the first tube includes an end portion having a plurality of protruding first tube lobes and a plurality of first tube lobe recesses; providing a metallic second tubular component including an end portion having a plurality of protruding second tubular component lobes and a plurality of second tubular component lobe recesses; wherein each lobe of the second tubular component lobes has a same size and geometry with each lobe of the first tube lobes such that each lobe of the plurality of first tube lobes is disposable in more than one recess of the plurality of second tubular component lobe recesses, and each lobe of the plurality of second tubular component lobes is disposable in more than one recess of the plurality of first tube recesses; disposing one lobe of the plurality of first tube lobes in one lobe recess of the plurality of second tubular component lobe recesses, respectively; disposing one lobe of the plurality of second tubular component lobes in one lobe recess of the plurality of first tube recesses, respectively; mechanically engaging the first tube end portion having the plurality of first tube lobes with the second tubular component end portion having the plurality of second tubular component lobes by translating toward one another in an axial direction on a common longitudinal axis, wherein each lobe of the plurality of first tube lobes mechanically engages with two adjacent lobes of the plurality of second tubular component lobes and each lobe of the plurality of second tubular component lobes mechanically engages with two adjacent lobes of the plurality of first tube lobes, such that a mechanical joint is formed which interlocks the first tube and the second tubular component against axial separation on the longitudinal axis;

wherein, during mechanically engaging the first tube end portion with the second tubular component end portion the nitinol of the first tube deforms, and elastically recovers when the mechanical joint is formed; wherein the first tube deformation includes moving the plurality of first tube lobes from an original position to an open position and holding the plurality of first tube lobes at the open position; wherein the first tube elastic recovery includes releasing the plurality of first tube lobes from the open position such that they return to the original position;

wherein superelasticity of the nitinol accommodates deformation and elastic recovery of the first tube when the mechanical joint is formed, whereby the nitinol undergoes a phase transformation between austenitic and martensitic phases; and wherein the metallic second tubular component is formed of stainless steel, cobalt alloy or nickel alloy.

* * * * *